United States Patent [19]
Asanuma et al.

[11] Patent Number: 5,742,240
[45] Date of Patent: Apr. 21, 1998

[54] TRAVEL CONTROL UNIT FOR VEHICLE

[75] Inventors: Nobuyoshi Asanuma; Hiroshi Sekine, both of Saitama, Japan

[73] Assignee: Honda Giken Kogyo Kabushiki Kaisha, Tokyo, Japan

[21] Appl. No.: 389,109

[22] Filed: Feb. 15, 1995

[30] Foreign Application Priority Data

Feb. 16, 1994 [JP] Japan ................................ 6-019586

[51] Int. Cl.$^6$ ............................................ G09G 1/123
[52] U.S. Cl. ........................ 340/995; 340/905; 340/736; 364/444.2
[58] Field of Search ................................ 340/905, 936, 340/988, 990, 995; 364/443, 444, 449, 444.2, 444.1, 449.7

[56] References Cited

U.S. PATENT DOCUMENTS

| | | | |
|---|---|---|---|
| 5,043,902 | 8/1991 | Yokoyama et al. | 340/995 |
| 5,146,219 | 9/1992 | Zechnall | 340/995 |
| 5,243,528 | 9/1993 | Lefebvre | 340/995 |
| 5,291,413 | 3/1994 | Tamai et al. | 340/995 |
| 5,291,414 | 3/1994 | Tamai et al. | 340/995 |
| 5,315,295 | 5/1994 | Fujii | 340/995 |
| 5,337,245 | 8/1994 | Matsuzaki | 340/995 |
| 5,398,189 | 3/1995 | Inoue et al. | 340/995 |
| 5,559,511 | 9/1996 | Ito et al. | 340/995 |

FOREIGN PATENT DOCUMENTS

| | | |
|---|---|---|
| 0543543 | 5/1993 | European Pat. Off. . |
| 0580167 | 1/1994 | European Pat. Off. . |
| 62-142216 | 6/1987 | Japan . |
| 1217210 | 8/1989 | Japan . |
| 2141899 | 5/1990 | Japan . |
| 441410 | 4/1992 | Japan . |
| 4290200 | 10/1992 | Japan . |
| 9204683 | 3/1992 | WIPO . |
| 9305492 | 3/1993 | WIPO . |

*Primary Examiner*—Jeffery A. Hofsass
*Assistant Examiner*—Benjamin C. Lee
*Attorney, Agent, or Firm*—Weiner, Carrier, Burt & Esser, P.C.; Joseph P. Carrier; William F. Esser

[57] ABSTRACT

A course travel judging device judges based on outputs from a map information outputting device and a subject vehicle position outputting device whether a subject vehicle is traveling on a course set by a course setting device. If the subject vehicle is traveling on the set course, a vehicle speed is controlled by a travel control device, so that the subject vehicle can safely pass through a curve ahead thereof. If the subject vehicle has deviated from the set course, an alarm is given to an occupant by an alarm device, and the control of vehicle speed by the travel control device is stopped. If a departing possibility judging device judges that there is a possibility of departing of the subject vehicle from the set course, a deviatable course is set by a deviatable course determining device, and the vehicle speed is controlled by the travel control device, so that the subject vehicle can safely pass through a curve having a severest passing condition on either of the set course or the deviatable course. Therefore, even if a vehicle has deviated from a course determined through a navigation system, an appropriate control of vehicle speed can be carried out.

12 Claims, 12 Drawing Sheets

When vehicle speed is small

When vehicle speed is large

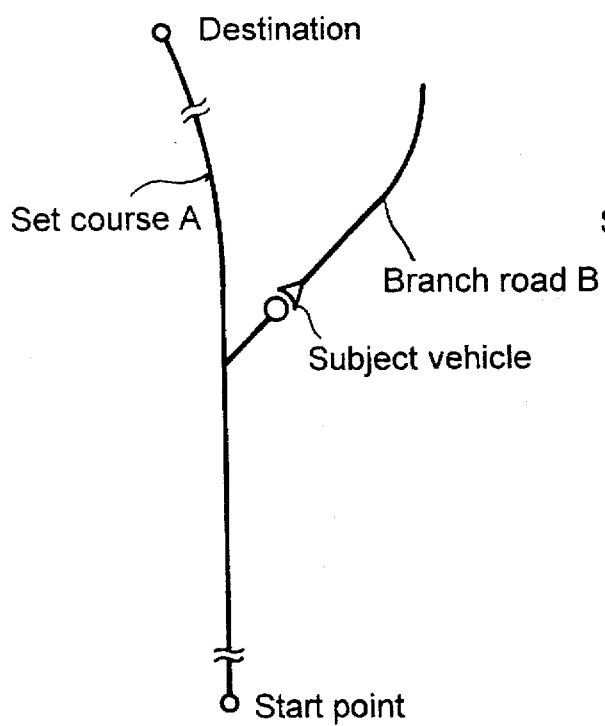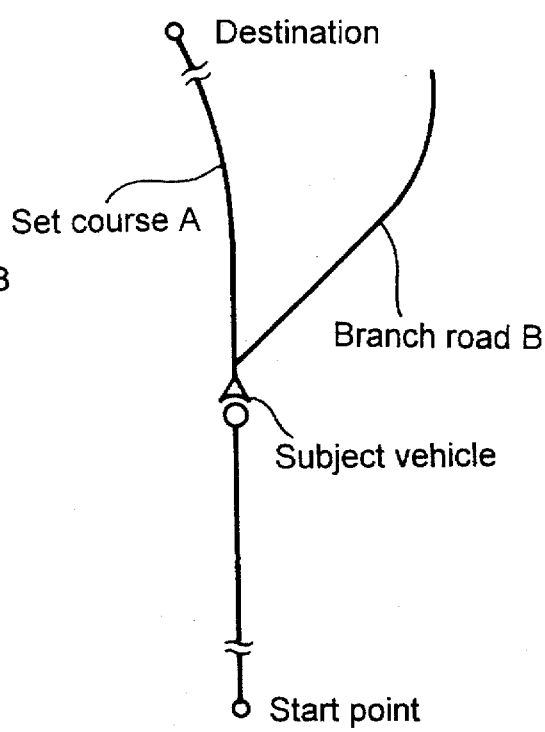

TRAVEL CONTROL UNIT FOR VEHICLE

BACKGROUND OF THE INVENTION

1. Field of the Invention

The present invention relates to a travel control unit for a vehicle, for determining a shape of a road by using a navigation system, so that a control or the like of a vehicle speed suitable for the road shape may be carried out.

2. Description of Relevant Art

Travel control units have already been known which are designed to set a travel course to a destination based on a map information provided from a navigation system and to give an alarm to a driver when a vehicle has deviated from the set course (for example, see Japanese Patent Application Laid-open Nos. 142216/1987, 217210/1989 and 141899/1990).

Such known travel control units judge whether it is possible for a vehicle to reliably pass a curve existing in a set course at a current vehicle speed, and control the vehicle speed by an automatic speed reduction or the like when the vehicle speed exceeds a speed permitting the vehicle to safely pass through the curve. Such control is, however, carried out based on a supposition that the vehicle is traveling on the set course. Therefore, there is a possibility that an appropriate control cannot be carried out if the vehicle has deviated from the set course with a driver's intention or due to a mistake.

SUMMARY OF THE INVENTION

Accordingly, it is an object of the present invention to provide a travel control unit which ensures that an appropriate travel control can be carried out even when the vehicle has deviated from the set course, or even when there is a possibility of departing of the vehicle from the set course.

To achieve the above object, according to a feature of the invention, there is provided a travel control unit comprising: a map information outputting means for outputting map information; a subject-vehicle position indicating means for indicating a position of a subject vehicle on an output map; a course setting means which outputs a set travel course to a destination; a course travel judging means for judging whether the subject vehicle is traveling on a set course and whether the subject vehicle has deviated from the set course; a travel control means for controlling a traveling state of the subject vehicle based on the set course; and an alarm means for providing an alarm to a driver; wherein when the course travel judging means judges that the subject vehicle has deviated from the set course, the alarm means provides the alarm to the driver and the operation of the travel control means is stopped.

With the above arrangement, if it is determined by the course travel judging means that the subject vehicle has deviated from the set course, the alarm means gives the alarm to the driver, and the operation of the travel control means is stopped. Therefore, it is possible not only to admonish the driver to return to the set course or to set a new course, but also to avoid an undesirable situation where a control of vehicle speed based on the set course is carried out on the deviated course.

According to another feature of the invention, there is provided a travel control unit comprising: a map information outputting means for outputting map information; a subject-vehicle position indicating means for indicating a position of a subject vehicle on an output map; a course setting means which outputs a set travel course to a destination; a course travel judging means for judging whether the subject vehicle is traveling on a set course; a deviated course setting means for determining a deviated course departing from the set course; a travel control means for controlling the traveling state of the subject vehicle based on one of the set course and the deviated course; and an alarm means for giving an alarm to the driver; wherein when the course travel judging means judges that the subject vehicle has deviated from the set course, the alarm means gives the alarm to the driver and the travel control means switches from a control based on the set course to a control based on the deviated course.

According to the above arrangement, if it is determined by the course travel judging means that the subject vehicle has deviated from the set course, the alarm means gives the alarm to the driver, and the travel control means switches from the control based on the set course to the control based on the deviated course. Therefore, it is possible not only to admonish the driver to return to the set course or to set a new course, but also to subsequently perform an appropriate control of vehicle speed based on the deviated course.

According to a further feature of the invention, there is provided a travel control unit comprising: a map information outputting means for outputting map information; a subject-vehicle position indicating means for indicating a position of a subject vehicle on a map; a course setting means which outputs a set travel course to a destination; a course travel judging means for judging whether the subject vehicle is traveling on a set course; a deviation-possibility judging means for judging a possibility that the subject vehicle may deviate from the set course; a deviatable course setting means for setting a deviatable course into which the subject vehicle may possibly deviate from the set course; a travel control means for controlling a traveling state of the subject vehicle based on one of the set course and the deviatable course; and an alarm means for giving an alarm to a driver of the vehicle; wherein when the deviation-possibility judging means judges that there is a possibility that the subject vehicle may deviate from the set course an alarm is given to the driver, and the travel control means switches from a control based on the set course to a control based on the deviatable course and the set course.

With the above arrangement, if it is determined by the deviation-possibility judging means that there is a possibility that the subject vehicle may deviate from the set course, the alarm is given to the driver by the alarm means, and the travel control means switches from the control based on the set course to the control based on the set course and the deviatable course. Therefore, it is possible not only to attract a driver's attention to prevent the vehicle from departing from the set course, but also to subsequently perform an appropriate control of vehicle speed based on the deviated course, even if the subject vehicle has entered the deviatable course.

In addition to the above described feature of the invention, the deviation-possibility judging means preferably judges a possibility that the subject vehicle may deviate from the set course based on an output from a direction-indicator operational state detecting means which detects the operational state of a turn indicator operated by the driver, and an output from a direction-indicator operation necessity judging means which judges whether it is necessary to operate the turn indicator at a position of the subject vehicle on the set course.

With the above arrangement, the deviation-possibility judging means judges the possibility of departing of the subject vehicle from the set course based on the output from the direction-indicator operational state detecting means and the output from the direction-indicator operation necessity judging means. Therefore, it is possible to reliably judge the possibility of departing of the subject vehicle from the set course.

The above and other objects, features and advantages of the invention will become apparent from the following description of the preferred embodiments taken in conjunction with the accompanying drawings.

BRIEF DESCRIPTION OF THE DRAWINGS

FIGS. 12A and 12B are diagrams for explaining the operation when the subject vehicle has deviated from a set course, and when there is a possibility of departing of the subject vehicle from the set course, respectively.

DETAILED DESCRIPTION OF THE PREFERRED EMBODIMENTS

The present invention will now be described by way of preferred embodiments with reference to the accompanying drawings.

Figure 1:
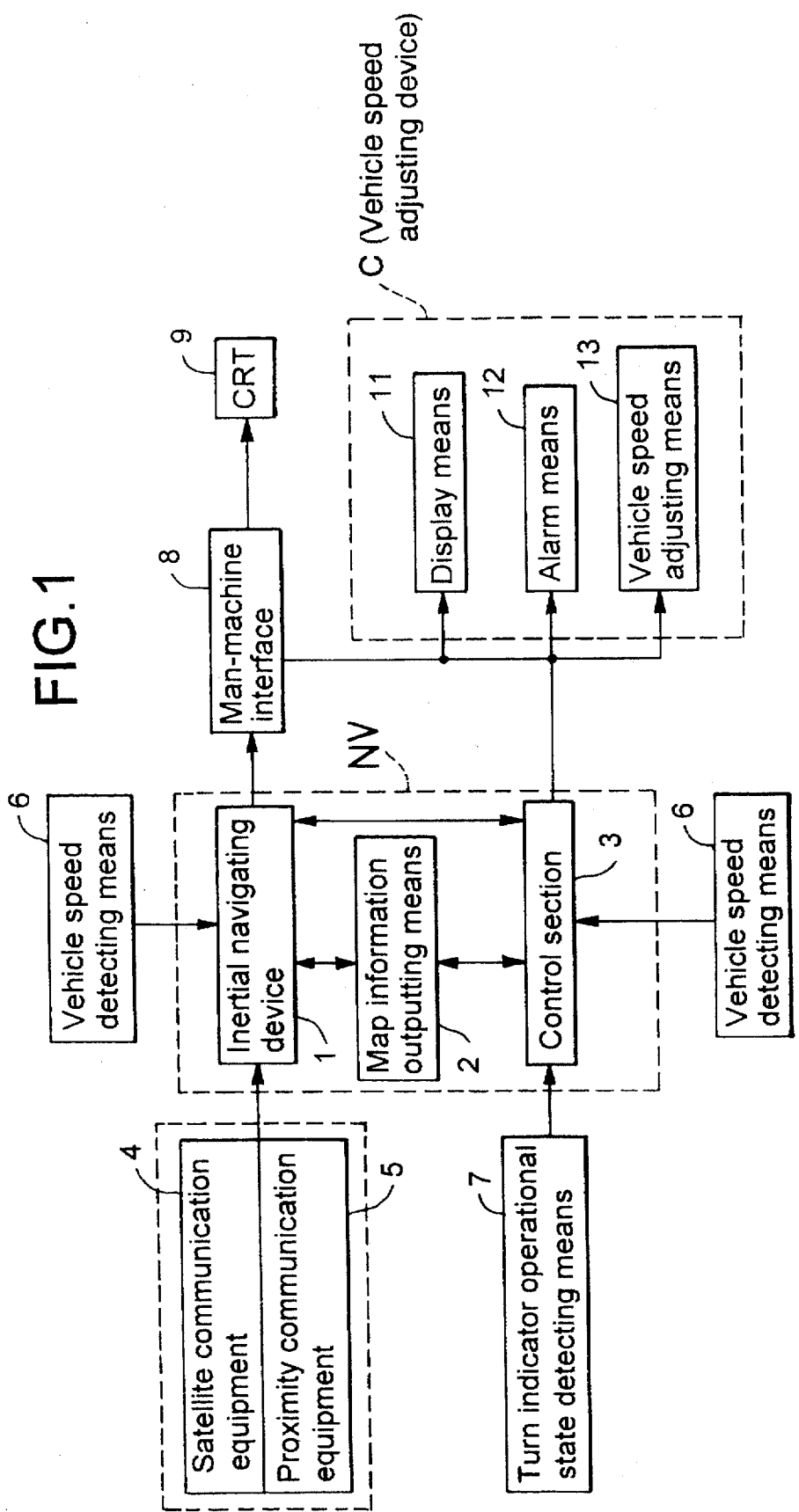
FIG. 1 is a block diagram illustrating the entire arrangement of a unit according to the present invention.

FIG. 1, NV is a navigation system for a vehicle. The navigation system includes, therein, a well-known inertial navigating device 1, a map information outputting means 2 using an IC card or CD-ROM, and a control section 3 for conducting various calculations which will be described hereinafter. The inertial navigating device 1 receives a signal from a vehicle speed detecting means 6 in addition to subject vehicle position information, road information, traffic information and the like from a satellite communication equipment 4 or a proximity communication equipment 5, and calculates the current position of a subject vehicle or a course to a destination based on such signal and map data from the map information outputting means 2 to display it on a CRT 9 through a man-machine interface 8. The control section 3 conducts various calculations (which will be described hereinafter) at a real time based on outputs from the inertial navigating device 1, the map information outputting means 2, the vehicle speed detecting means 6 and a turn indicator operational state detecting means 7.

C is a vehicle speed adjusting device which includes a display means 11, an alarm means 12 and a vehicle speed adjusting means 13. The display means 11 may be, for example, a head-up display and displays a road map, the position of the subject vehicle or a vehicle speed at which the subject vehicle can safely pass through a curve. The alarm means 12 may be an acoustic means such as a buzzer or a chime and gives various alarms to a driver. The vehicle speed adjusting means 13 may be a brake device, an auto-cruising device or the like and adjusts the vehicle speed, so that the subject vehicle can safely pass through a curve.

Figure 2:
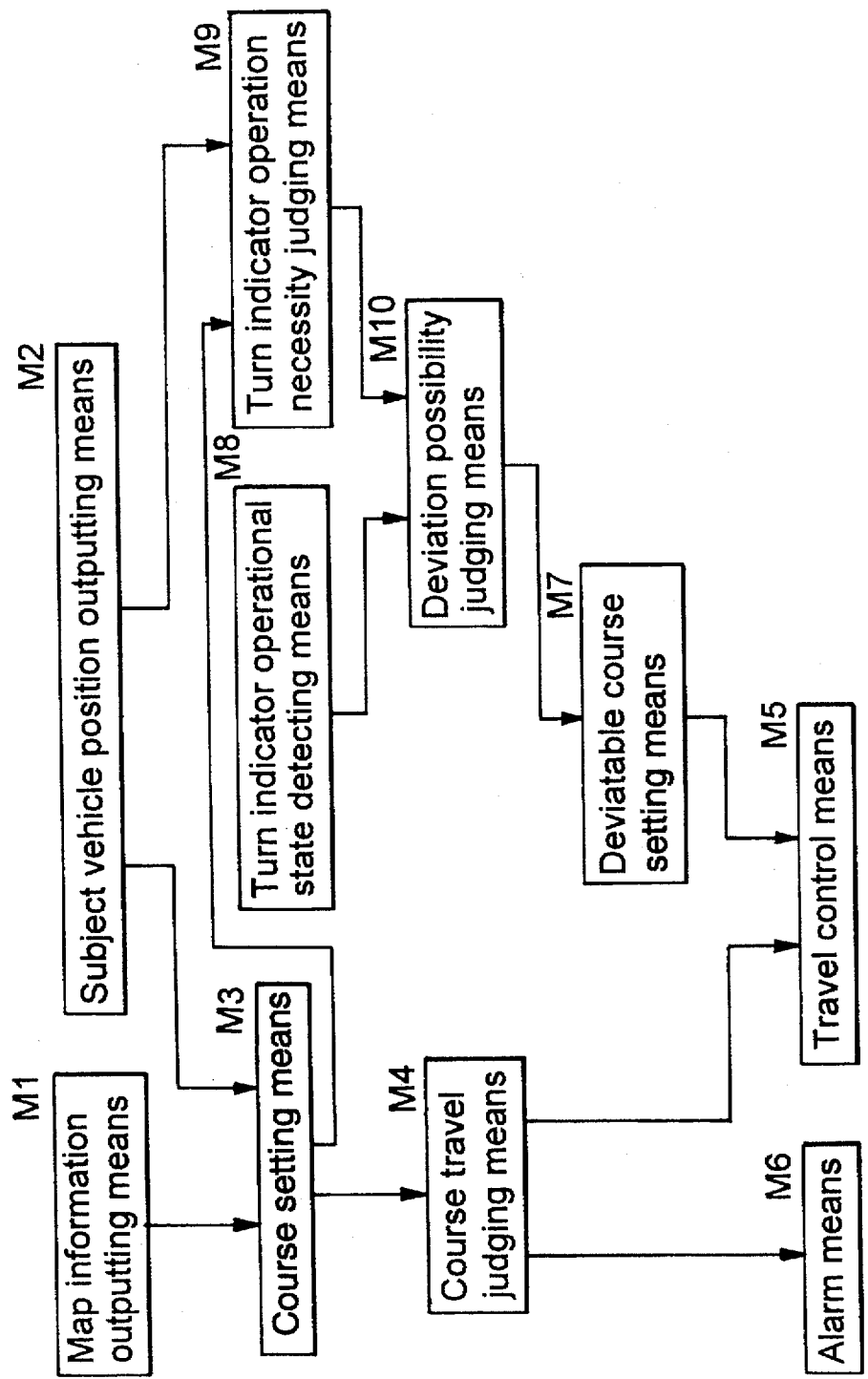
FIG. 2 is a block diagram of a control system.

FIG. 2 is a block diagram illustrating a control system according to the present invention. The control system includes a map information outputting means M1 corresponding to the map information outputting means 2, a subject-vehicle position outputting means M2 corresponding to the inertial navigating device 1, an alarm means M6 corresponding to the alarm means 12, a travel control means M5 corresponding to the vehicle speed adjusting means 13, and a turn indicator operational state detecting means M8 corresponding to the turn indicator operational state detecting means 7. The control system further includes a course setting means M3, a course travel judging means M4, a deviatable course setting means M7, a turn indicator operation necessity judging means M9 and a deviation-possibility judging means M10, which corresponds to the control section 3.

The course setting means M3 sets an optimal recommended course from the current position of the subject vehicle to a destination.

The course travel judging means M4 judges whether the subject vehicle has deviated from the course set in the course setting means M3. If a deviation between the set course and the position of the subject vehicle exceeds a predetermined value, it is determined that the subject vehicle has deviated from the set course.

The turn indicator operation necessity judging means M9 judges whether it is necessary to operate a turn indicator on the set course and branch roads from the set course and the current position of the vehicle.

The deviation-possibility judging means M10 judges a possibility that the subject vehicle may deviate from the set course based on an output from the turn indicator operational state detecting means M8 and an output from the turn indicator operation necessity judging means M9. Specifically, if the operation of the turn indicator is not detected by the turn indicator operational state detecting means MS, notwithstanding that the turn indicator operation necessity judging means M9 determined that it was necessary to operate the turn indicator, or if the operation of the turn indicator is detected by the turn indicator operational state detecting means M8, notwithstanding that the turn indicator operation necessity judging means M9 did not determine that it was necessary to operate the turn indicator, the deviation-possibility judging means M10 judges that there is a possibility of deviation.

The deviatable course setting means M7 extracts a course into which the subject vehicle may possibly deviate from the set course (which will be referred to as a deviatable course) from a map information and determines sets of such deviatable course, when the deviation-possibility judging means M10 judges that there is the possibility of departing from the set course.

The operation of the first embodiment of the present invention will be described below with reference to the flow chart shown in FIGS. 3 and 4.

First, the course setting means M3 determines a recommended course to a destination based on the outputs from the map information outputting means M1 and the subject-vehicle position outputting means M2 (at step S1), and the guidance of the vehicle is started based on the recommended course (i.e., the set course) (at step S2).

Then, a vehicle speed $V_0$ and a position $P_0$ ($X_0$, $Y_0$) of the subject vehicle are read based on the outputs from the vehicle speed detecting means 6 and the subject vehicle position outputting means M2 (at step S3). Then, a road shape judgment section S is determined according to an equation, for example, $S=V_0^2/\beta$ (at step S4), wherein $\beta$ is a predetermined deceleration, and the road shape judgment section S corresponds to a travel distance until the subject vehicle traveling at the vehicle speed $V_0$ is stopped upon reduction of the subject vehicle speed at the deceleration $\beta$.

Subsequently, the course travel judging means M4 judges whether the subject vehicle is traveling on the set course (at step S5). If YES, i.e., the subject vehicle is traveling on the set course, it is judged whether there is a branch road within the road shape judgment section S (at step S6). If NO, i.e., there is no branch road, the processing is returned to step S3. If YES at step S6, i.e., there is a branch road, the deviation-possibility judging means M10 judges whether there is a possibility of deviation from the set course (at step S7). The judgment of the possibility of departing by the deviation-possibility judging means M10 is carried out by comparing the output from the turn indicator operational state detecting means M8 with the output from the turn indicator operation necessity judging means M9.

If YES at step S7, i.e., there is no possibility of departing from the set course, the road shape of the set course is determined (step S8). Therefore, it is judged whether there is a curve in the set course (at step S9). If NO, i.e., there is no curve, the processing is returned to step S3. If YES, i.e., there is a curve, it is judged whether it is possible for the vehicle to safely pass through the curve at the current vehicle speed $V_0$ (at step S10). If YES at step S10, the processing is returned to step S3. If NO at step S10, an alarm is given to the driver by the alarm means M6 (12), and an automatic deceleration is conducted by the travel control means M5 (the vehicle speed adjusting means 13) (at step S11).

The processings at steps S8 to S11 will be further described in detail with reference to FIGS. 5 to 9.

First, a virtual position $P_1$ ($X_1$, $Y_1$) of the subject vehicle is set ahead of the current position $P_0$ ($X_0$, $Y_0$) of the subject vehicle by a distance of the road shape judgment section S. The virtual position $P_1$ ($X_1$, $Y_1$) of the subject vehicle is set on a first node point $N_0$ existing inside the road shape judgment section S, and is a reference position for judging whether it is possible for the vehicle to safely pass through a curve and for determining a target vehicle speed $V_S$ permitting the vehicle to safely pass through the curve.

Then, a minimum vehicle-turnable radius R is calculated based on the vehicle speed $V_0$. This minimum turnable radius R is calculated from the current vehicle speed $V_0$ and a preset lateral acceleration a according to an equation of $R=V_0^2/\alpha$. The minimum turnable radius R is larger as the vehicle speed $V_0$ is larger, and the minimum turnable radius R is smaller as the vehicle speed $V_0$ is smaller.

Figure 5:
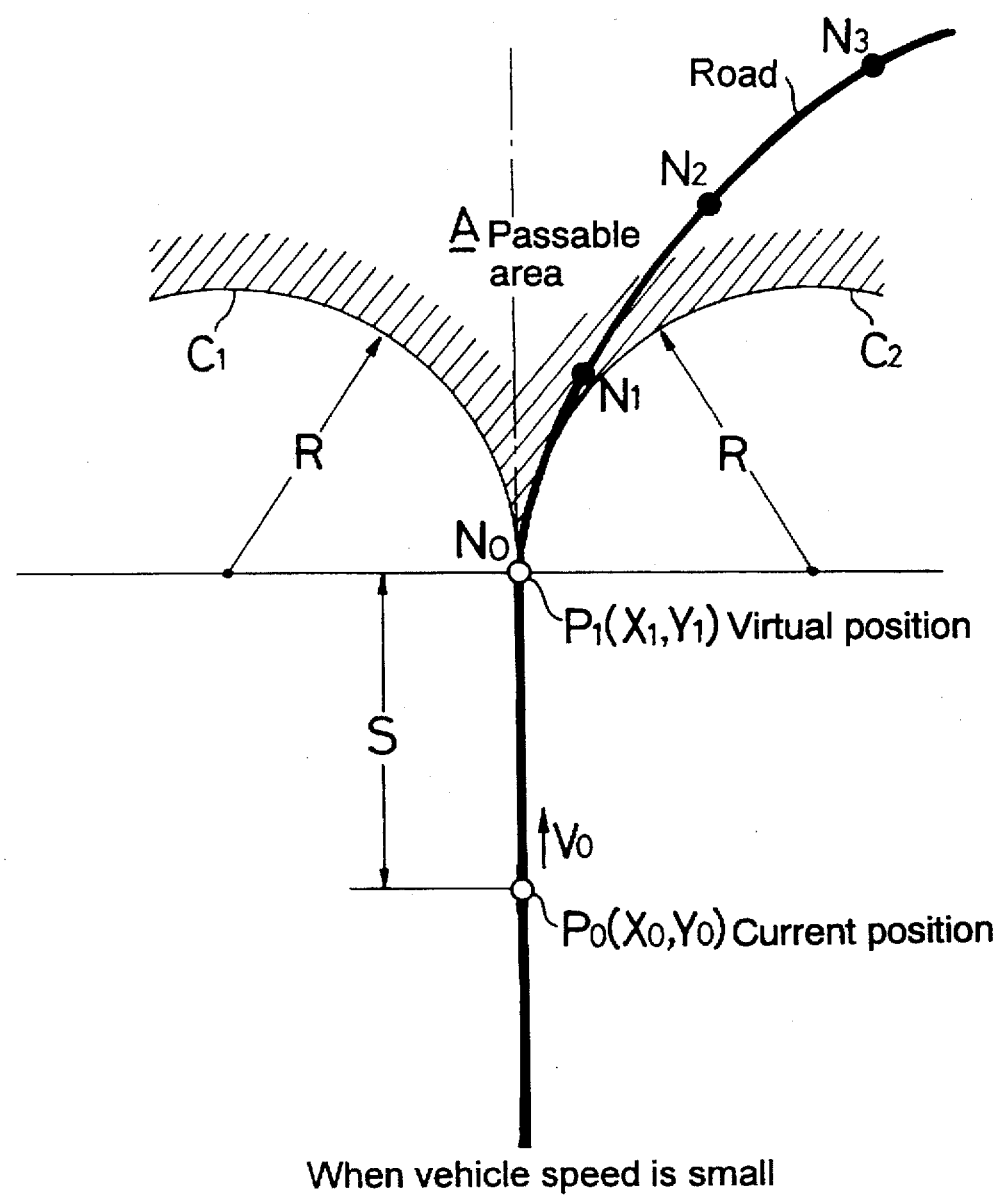
FIG. 5 is a diagram for explaining the operation when a vehicle is at a low vehicle speed.
Figure 6:
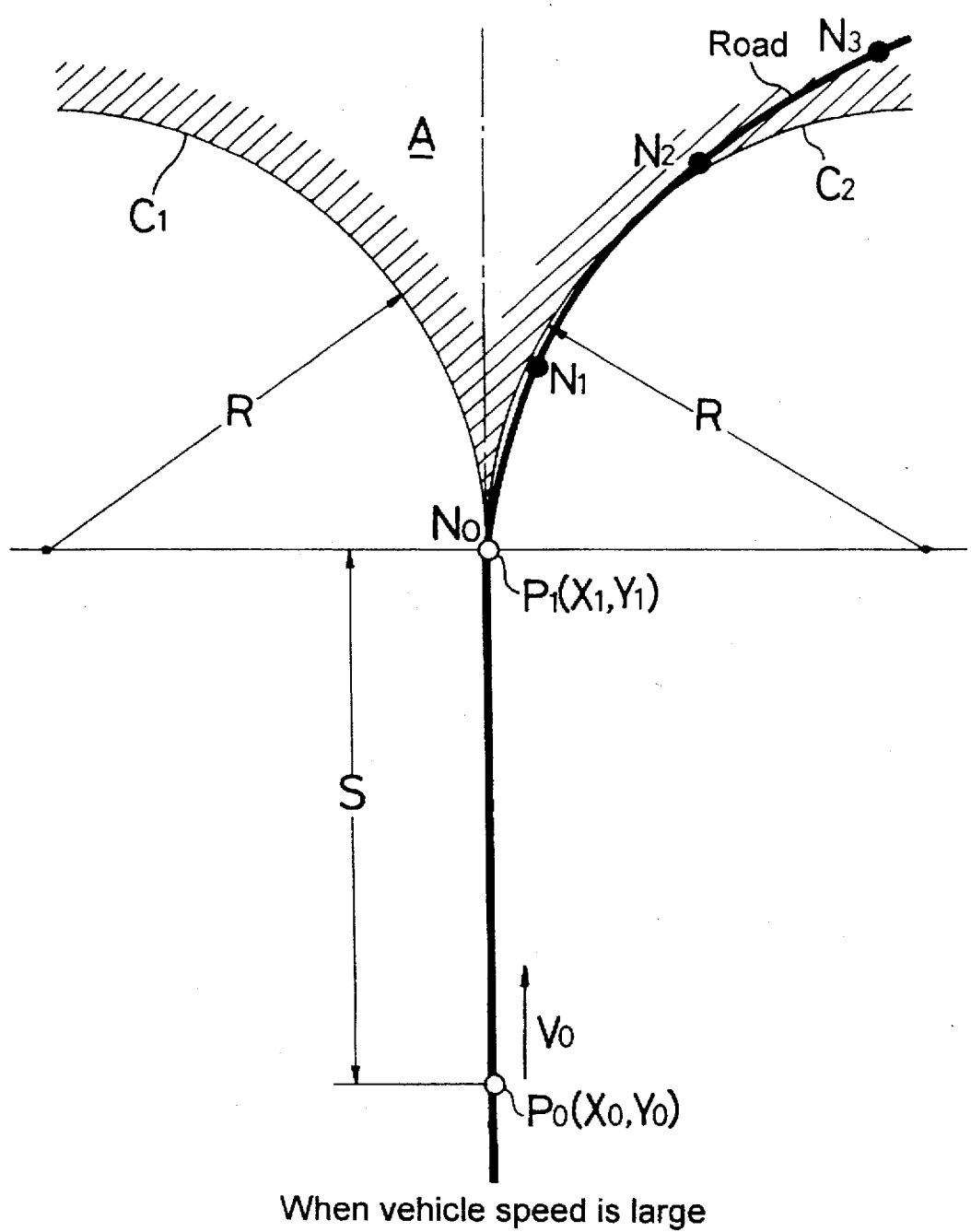
FIG. 6 is a diagram for explaining the operation when the vehicle is at a high vehicle speed.

Subsequently, a passable area A is calculated. More specifically, two circular arcs $C_1$ and $C_2$ having the same radius equal to the minimum turnable radius R are described so as to be tangent to each other at the virtual position $P_1$ ($X_1$, $Y_1$) of the subject vehicle. And the passable area A is set outside the two circular arcs $C_1$ and $C_2$. As shown in FIG. 5, when the vehicle speed $V_0$ is small, the minimum turnable radius R is also small and hence, the passable area A becomes wide. Conversely, as shown in FIG. 6, when the vehicle speed $V_0$ is large, the minimum turnable radius R is also large and hence, the passable area A becomes narrow. A remote limit of the passable area A is defined by a circular arc having a radius $K \times V_0$ (wherein K is a constant) about the virtual position $P_1$ ($X_1$, $Y_1$).

Then, it is judged whether it is necessary to reduce the current vehicle speed $V_0$ in order to permit the vehicle to safely pass through a curve. More specifically, it is judged whether road data provided from the map information outputting means 2, i.e., a plurality of node points $N=N_1$, $N_2$, $N_3$—established on the road, exist within the passable area A. When the node points N exist within the passable area A, such as shown in FIG. 5, it is determined that the current vehicle speed $V_0$ is smaller than a target vehicle speed $V_S$, and that it is possible for the vehicle to safely pass through the curve while maintaining the current vehicle speed $V_0$. Conversely, when one or more of the node points N is out of the passable area A, as shown in FIG. 6, it is determined that it is impossible for the vehicle to safely pass through the curve at the current vehicle speed $V_0$.

Figure 7:
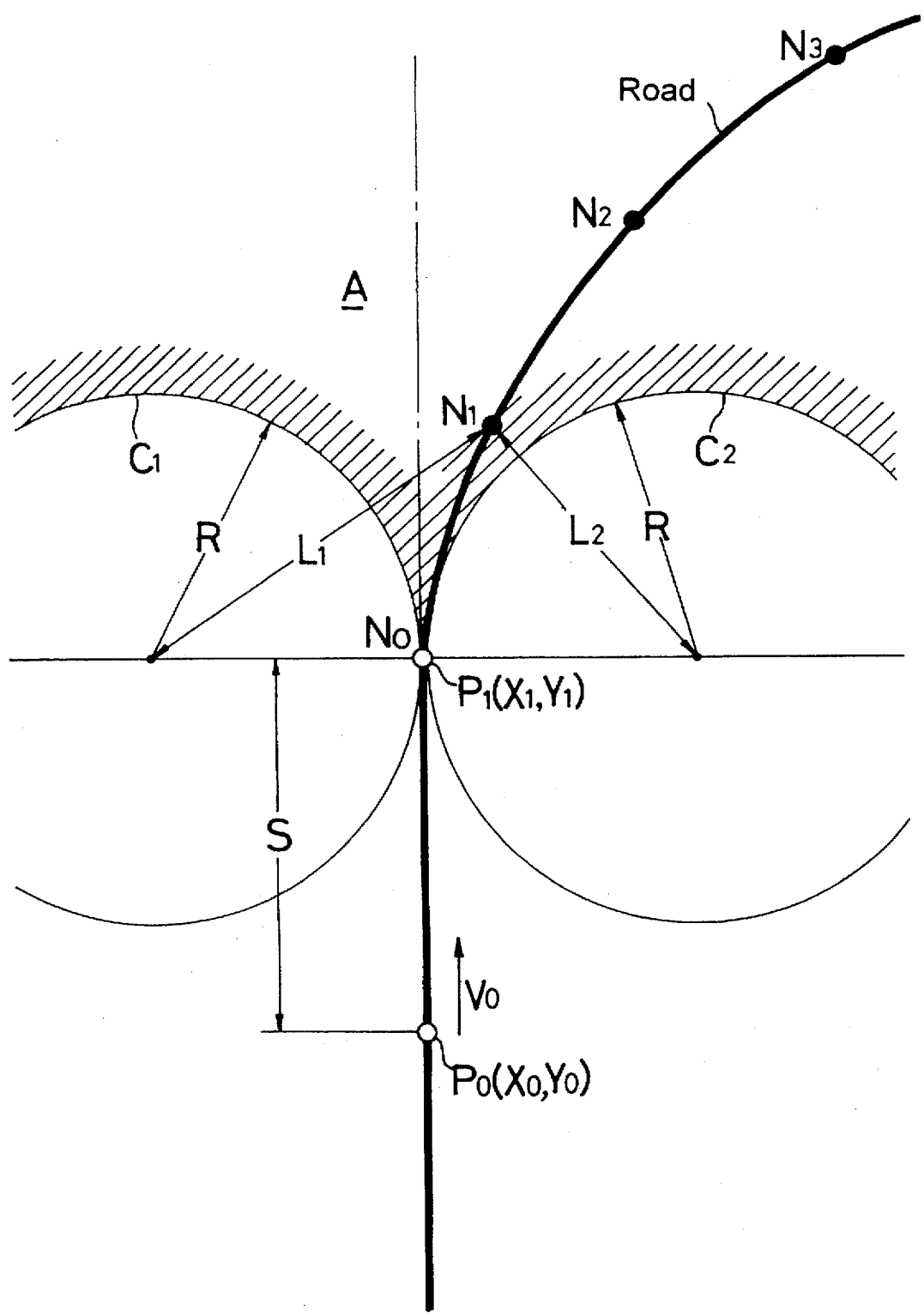
FIG. 7 is a diagram for explaining the operation when a road is within a passable area.
Figure 8:
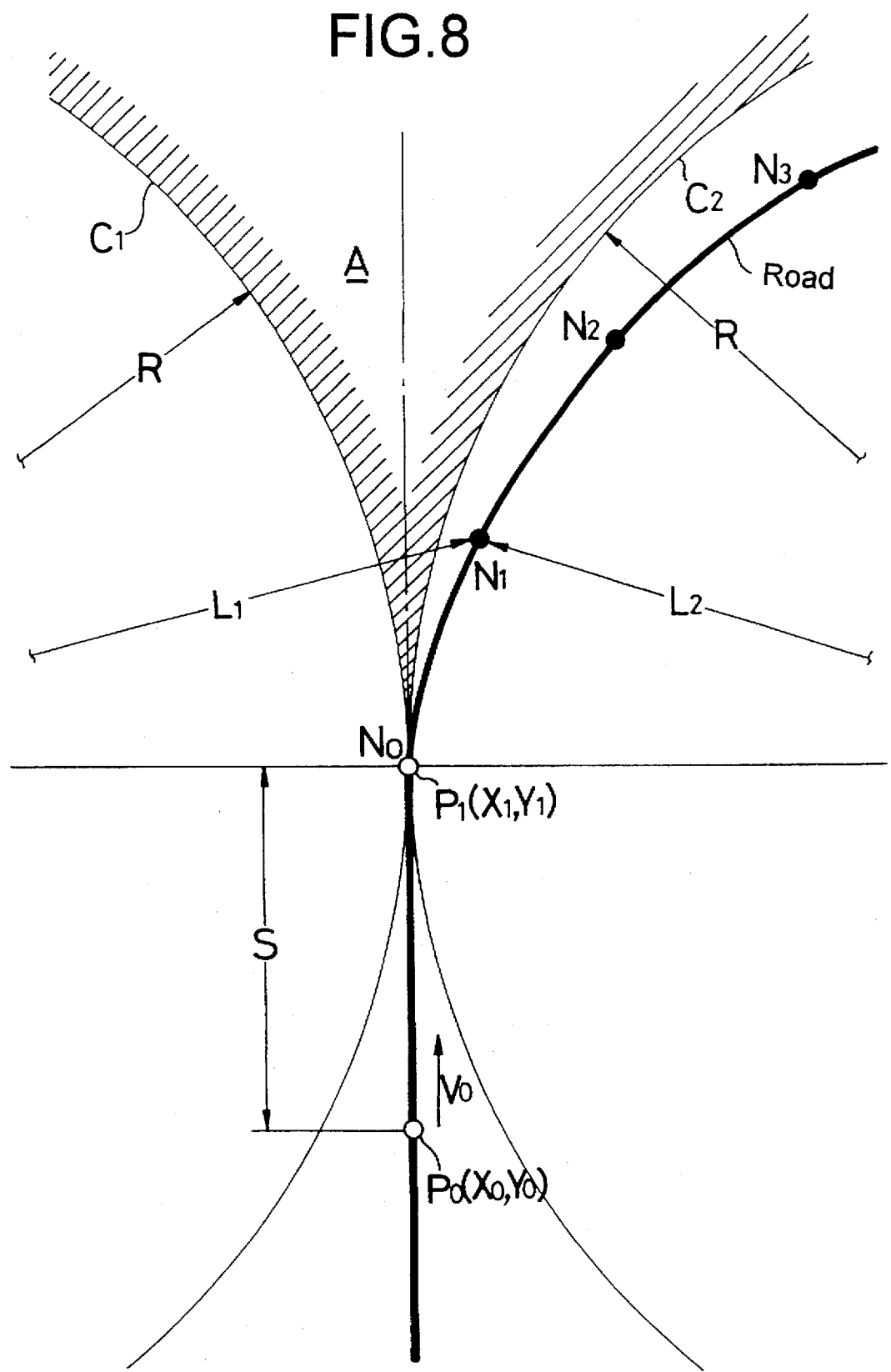
FIG. 8 is a diagram for explaining the operation when a road is out of the passable area.

It is judged in the following manner whether the node points N exist inside or outside the passable area A. If both distances $L_1$ and $L_2$ between the centers of the two circular arcs $C_1$ and $C_2$ having the radius R and a node point N are larger than the radius R, such as shown in FIG. 7, it is determined that such node point N exists inside the passable area A, and it is possible for the vehicle to safely pass through such node point N. On the other hand, if one of the distances $L_1$ and $L_2$ (e.g., $L_2$) between the centers of the two circular arcs $C_1$ and $C_2$ having the radius R and a node point N is smaller than the radius R, such as shown in FIG. 8, it is determined that such node point is out of the passable area A, and it is impossible for the vehicle to safely pass through such node point N at the current vehicle speed $V_0$.

Figure 9:
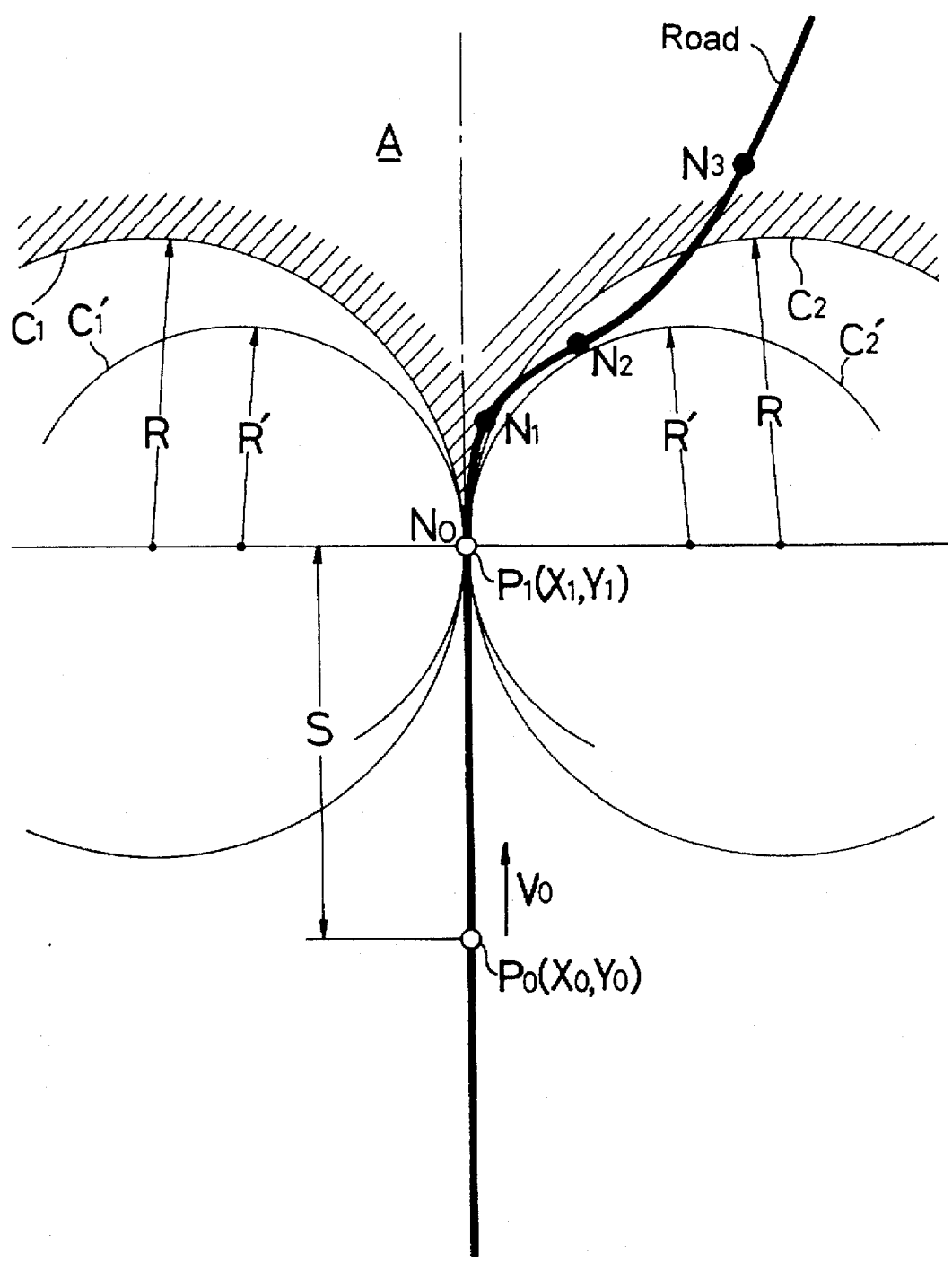
FIG. 9 is a diagram for explaining the determination of a target vehicle speed.
Figure 10:
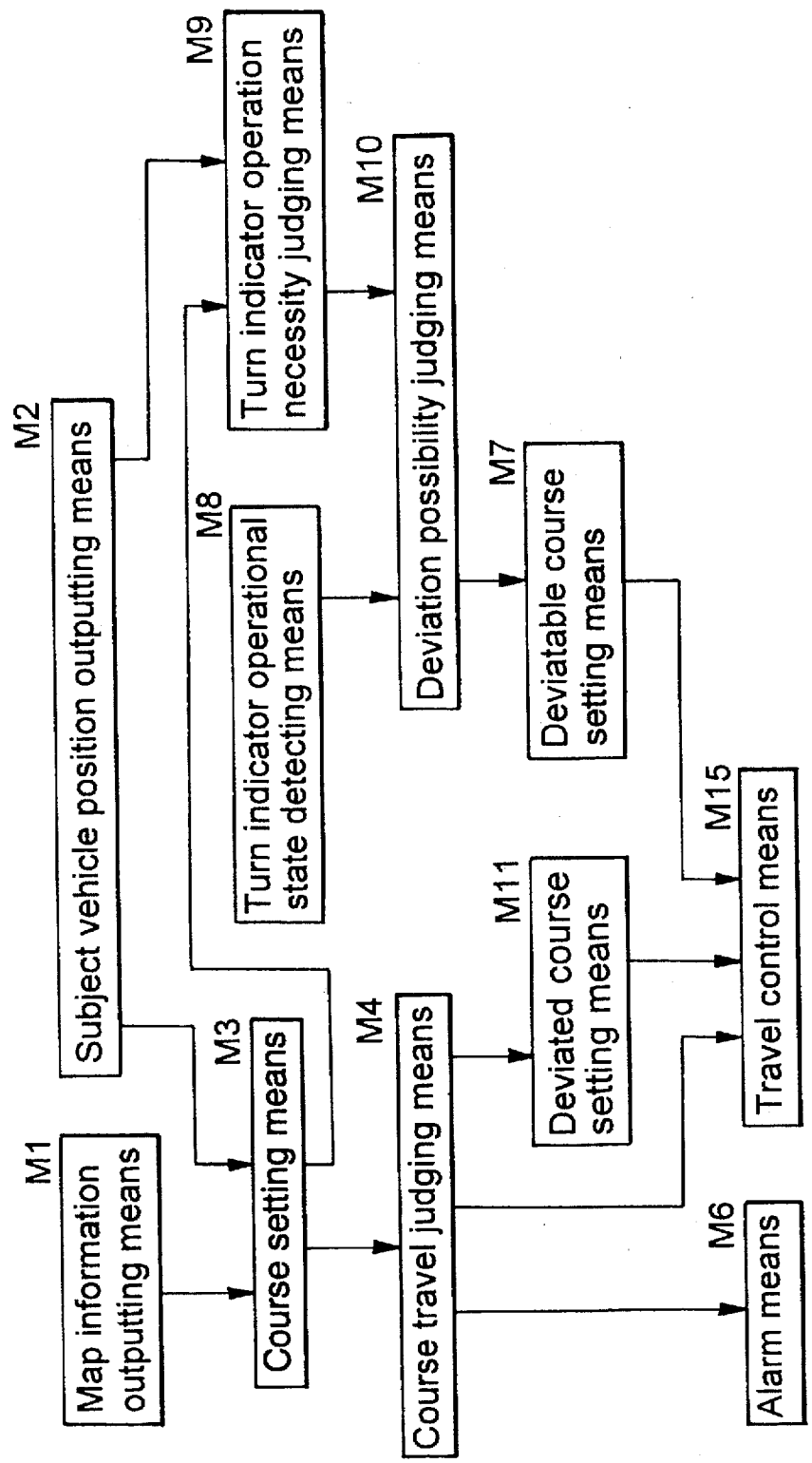
FIG. 10 is a block diagram similar to FIG. 2, but illustrating a second embodiment.

If a node point $N_2$ is out of the passable area A even though, for example, node points $N_1$ and $N_3$ exist inside the passable area A, as shown in FIG. 9, it is impossible for the vehicle to safely pass through the curve at the current vehicle speed. Therefore, in order for the vehicle to safely pass through the curve at the current vehicle speed $V_0$, it is required that all the node points N exist inside the passable area A.

Then, a target vehicle speed $V_S$ which is a maximum vehicle speed permitting the vehicle to safely pass through a node point N is calculated for each of a plurality of node points $N=N_1$, $N_2$, $N_3$—established on the road. More specifically, for example, for the node point $N_1$, the target vehicle speed $V_S$ is calculated according to an equation of $V_S=(\alpha \times L_2)^{1/2}$ based on the preset lateral acceleration $\alpha$ and a smaller one of the distances $L_1$ and $L_2$ (i.e., $L_2$) from the centers of the circular arcs $C_1$ and $C_2$ to the node point $N_1$, such as shown in FIG. 8. Then, the target vehicle speeds $V_S$ determined for the node points $N=N_1$, $N_2$, $N_3$—are stored in a memory.

In judging whether it is possible for the vehicle to safely pass through the curve, the magnitudes of the vehicle speed $V_0$ and the target vehicle speeds $V_S$ may be directly compared with each other without use of the passable area A.

If it is determined that the reduction in speed is required, an alarm is given to the driver by the alarm means M6 (12), and an automatic reduction in speed is performed by the travel control means M5 (i.e., the vehicle speed adjusting means 13), until the current vehicle speed $V_0$ is reduced down to the target vehicle speed $V_S$ permitting the vehicle to safely pass through the curve.

Figure 3:
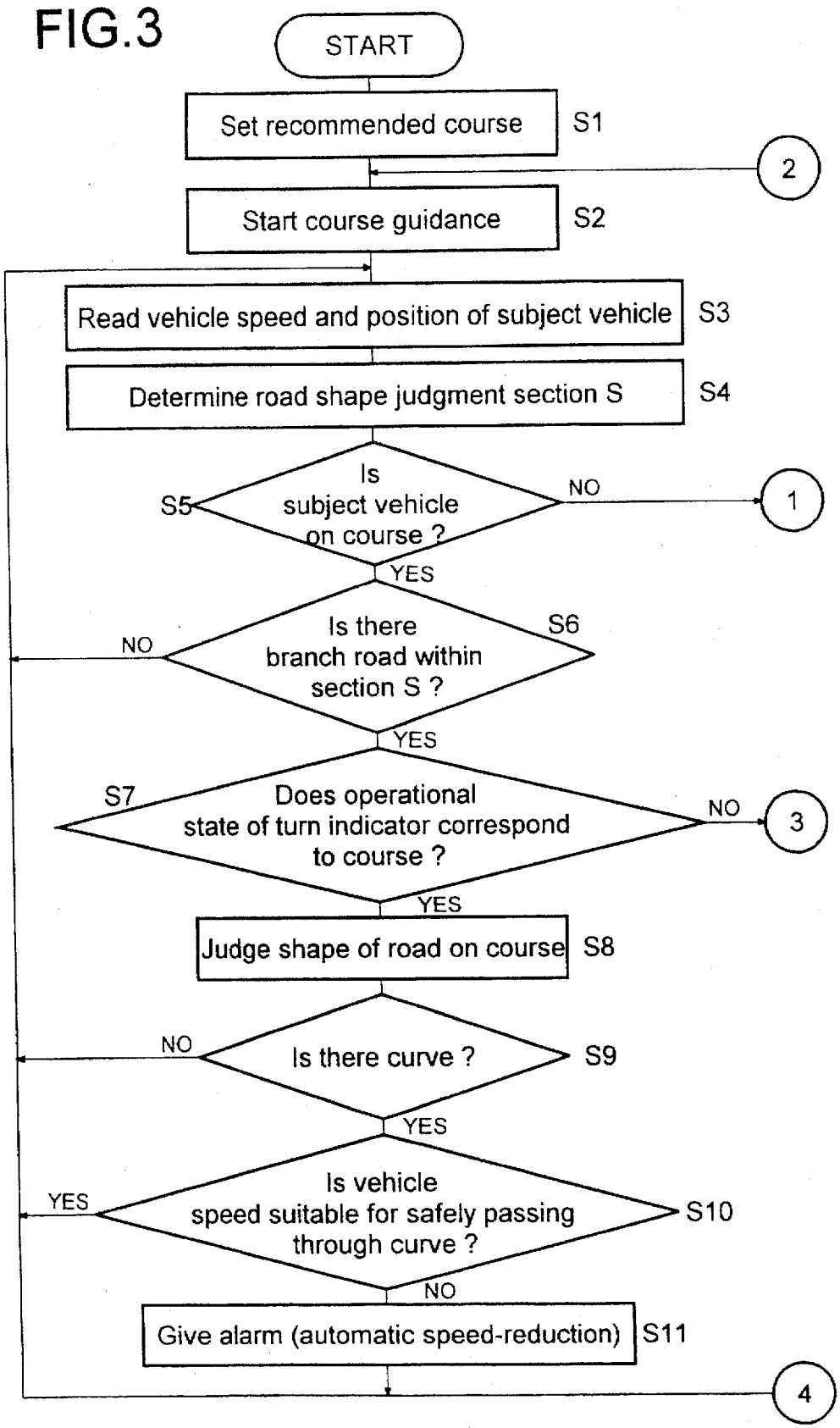
FIG. 3 is a first portion of a flow chart illustrating the operation of the unit.
Figure 4:
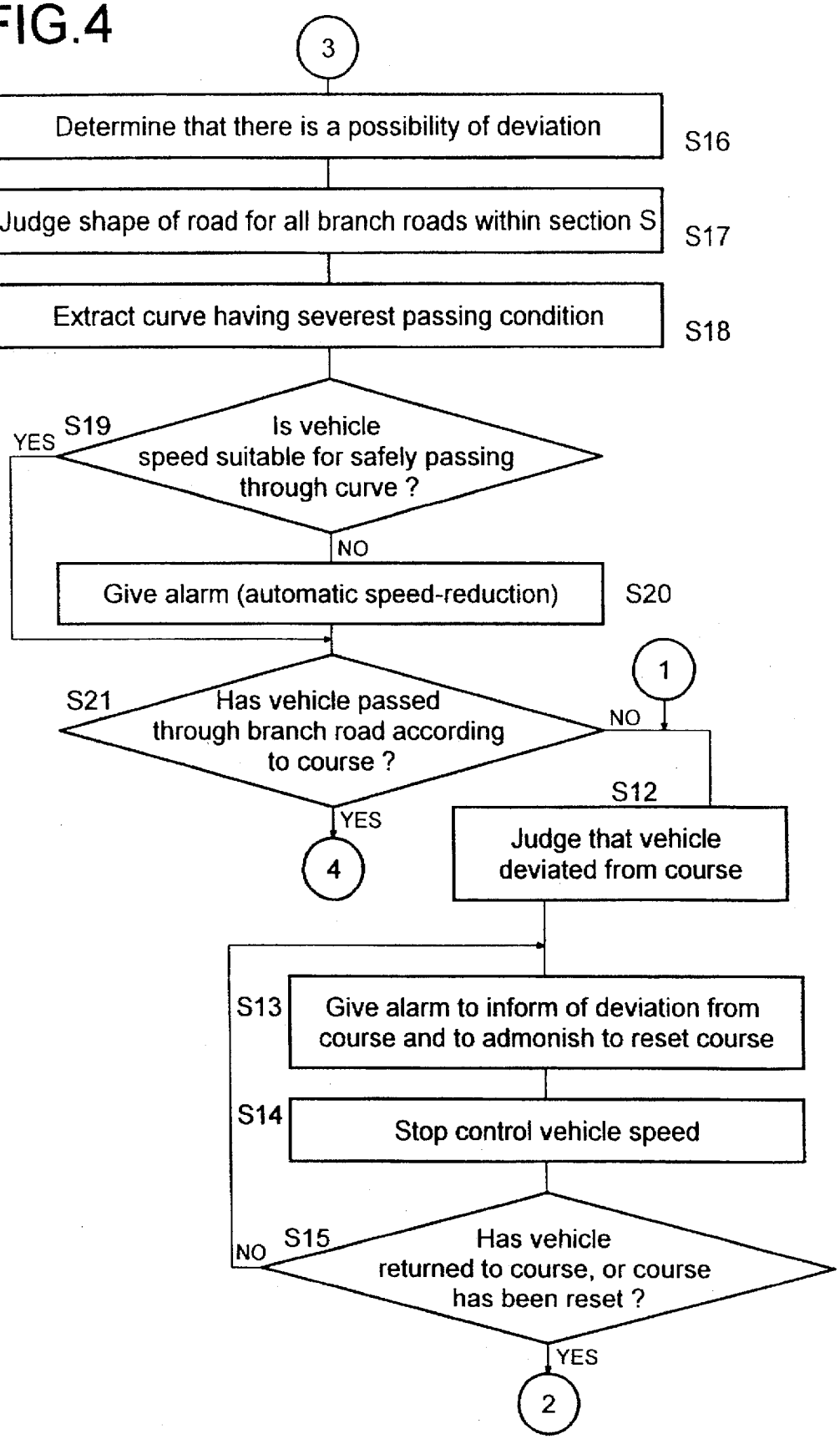
FIG. 4 is a second portion of the flow chart.

Now with reference to FIGS. 3 and 4, if NO at step S5 and it is determined by the course travel judging means M4 that the vehicle has deviated from the set course (at step S12), i.e., the vehicle has deviated into a branch road, the alarm means M6 (12) provides an alarm to the driver to inform the driver that he or she has departed from the course and to admonish the driver to reestablish a course (at step S13), and the control of vehicle speed by the travel control means M5 (13) is stopped (at step S14). Thus, it is possible to avoid an unsuitable control conducted based on the set course when the vehicle is actually traveling on a course different from the set course. At subsequent step S15, if the driver becomes aware of a mistake by the alarm and corrects the mistaken course to the rightful course, or newly establishes or resets a course again, the processing is returned to step S2.

If NO at step S7 and the deviation-possibility judging means M10 judged that there is a possibility of departing from the set course (at step S16), i.e., there is a possibility of departing of the vehicle into a branch road, such as shown in FIG. 12B, the same judgment of the road shape as at step S8 is carried out for the set course and all the branch roads branched from the set course within section S (at step S17), and as a result, a curve having a severest passing condition is extracted (at step S18). Then, it is judged in the same manner as at step S10 whether it is possible for the vehicle to safely turn through the curve having the severest passing condition (at step S19). If NO, i.e., it is impossible for the vehicle to safely pass through such curve, an alarm is given to the driver by the alarm means M6 (12) and the automatic reduction in speed is carried out by the travel control means M5 (i.e., the vehicle speed adjusting means 13) as at step S11 (at step S20).

Then, at step S21, it is judged whether the vehicle has proceeded through the branch road according to the set course. If YES and the subject vehicle has not deviated from the set course, the processing is returned to step S3. If NO at step S21 and the subject vehicle has deviated from the set course, the processing is advanced to step S12.

As described above, if there is a possibility of departing of the subject vehicle from the set course, a possibility of passing of the subject vehicle through the curve is judged for the set course and all the branch roads. Therefore, should the subject vehicle have deviated from the set course, it is possible for the subject vehicle to safely pass through the curve at an appropriate vehicle speed.

A second embodiment of the present invention will now be described with reference to FIGS. 10 to 12B.

The second embodiment is different from the first embodiment in that it further includes a deviated course setting means M11 (see FIG. 10) for determining a deviated course which is deviated from the set course, when it is determined by the course travel judging means M4 that the subject vehicle has deviated from the set course.

Figure 11:
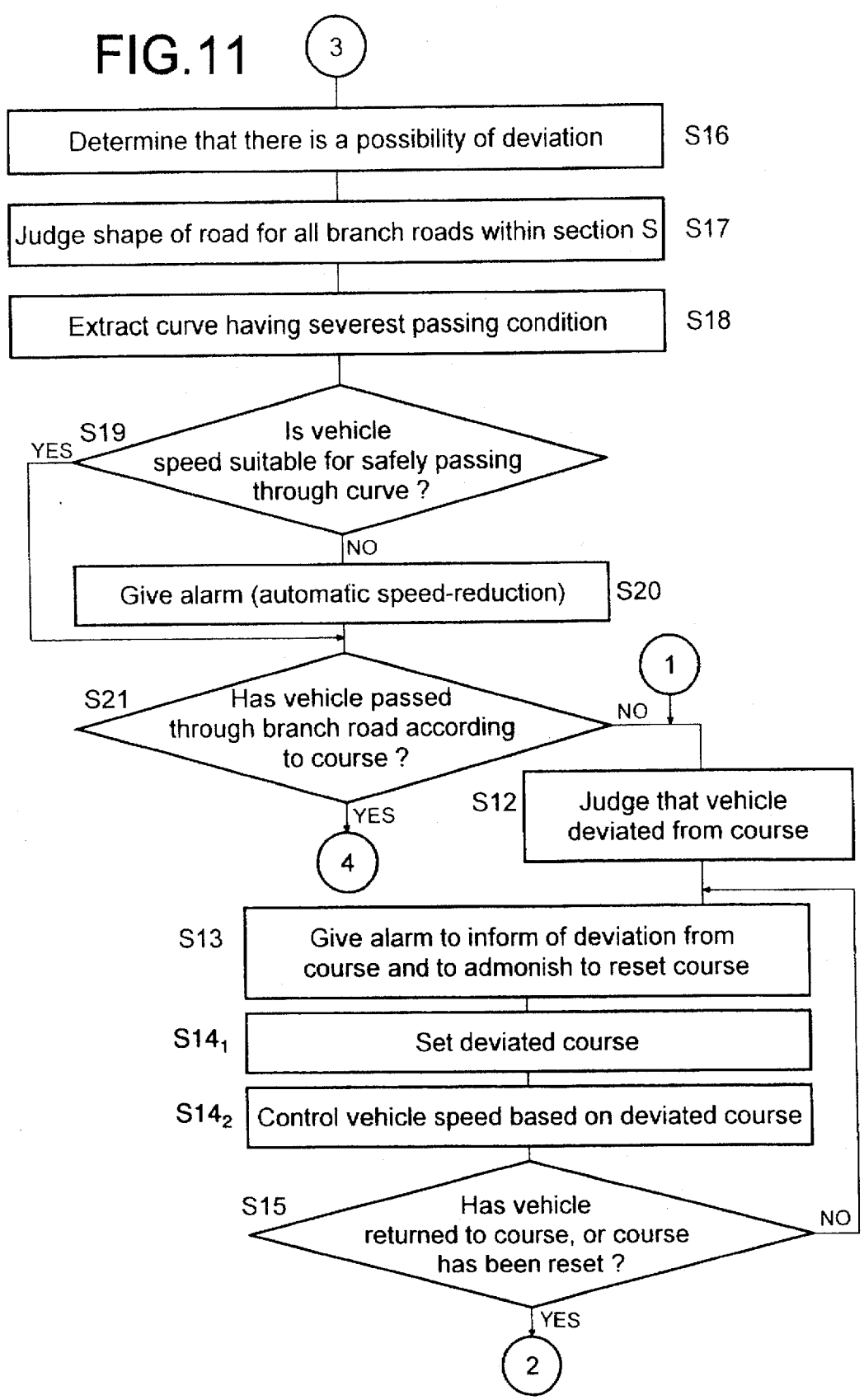
FIG. 11 is a flow chart similar to FIG. 4, but in the second embodiment.

In place of stopping of the control of the vehicle speed at step S14 in the flow chart shown in FIG. 4 and carried out when it is determined that the subject vehicle has deviated from the set course, a deviated course is set at step S141 by the deviated course setting means M11, and the control of the vehicle speed in accordance with the shape of the deviated course is carried out at step S14$_2$, as shown in a flow chart shown in FIG. 11. The control of the vehicle speed on the deviated course is continued until the subject vehicle is returned to the originally set course, or a new course is set at step S15.

If the subject vehicle has deviated from the set course A into a branch road B in the above manner (see FIG. 12A), the vehicle speed is controlled based on the shape of the branch road B. Thus, even if the subject vehicle deviates from the set course A, an appropriate control of the vehicle speed can be continued. If there is a possibility that the subject vehicle may deviate from the set course A into the branch road B (see FIG. 12B), it is judged as in the first embodiment whether it is possible for the subject vehicle to pass through both the set course and the branch road B. Thus, regardless of whether the subject vehicle enters the set course A or the branch road B, the appropriate control of vehicle speed can be continued. In this case, if the subject vehicle finally enters the set course A, the control of vehicle speed is switched to a control based on the shape of the set course A. If the subject vehicle finally enters the branch road B, the control of vehicle speed is switched to a control of vehicle speed based on the shape of the branch road B.

Although the embodiments of the present invention have been described in detail, it will be understood that the present invention is not limited to these embodiments, and various modifications may be made.

What is claimed is:

1. A travel control unit comprising:
   a map information outputting means for outputting map information representing an output map;
   a subject-vehicle position indicating means for indicating a position of a subject vehicle on said output map;
   a course setting means which outputs a set travel course to a destination;
   a course travel judging means for judging whether the subject vehicle is traveling on said set course;
   a deviation-possibility judging means for judging a possibility that the subject vehicle may deviate from said set course;
   a deviatable course setting means for setting a deviatable course into which the subject vehicle may possibly deviate from said set course;
   a travel control means for controlling the traveling state of the subject vehicle based on at least one of said set course and said deviatable course; and
   an alarm means for giving an alarm to a driver of the vehicle; wherein
   when said deviation-possibility judging means judges that there is a possibility that the subject vehicle may deviate from said set course, an alarm is given to the driver, and said travel control means switches from said control based on the set course to said control based on said deviatable course and said set course.

2. A travel control unit according to claim 1, wherein when said deviation-possibility judging means judges that there is said possibility that the subject vehicle may deviate from said set course, said travel control means switches from said control based on the set course to said control based on both said deviatable course and said set course.

3. A travel control unit according to claim 1, wherein said travel control means determines which of said set course and said deviatable course represents a severest passing condition, and controls the traveling state of the subject vehicle based on said severest passing condition.

4. A travel control unit according to claim 1, further including a direction-indicator operation necessity judging means operatively associated with said map information output means, for judging whether it is necessary to operate a turn indicator of the subject vehicle at at least one position of the subject vehicle on said set course.

5. A travel control unit according to claim 4, wherein said deviation-possibility judging means judges that there is a possibility that the subject vehicle may deviate from said set course based on an output from said direction-indicator operation necessity judging means.

6. A travel control unit according to claim 4, wherein said travel control means switches from the control based on the set course to the control based on said deviatable course and said set course, the travel control means determines which of said set course and each possible position of the subject vehicle on said deviatable course represents a severest passing condition, and controls the traveling state of the subject vehicle based on said severest passing condition.

7. A travel control unit according to claim 6, wherein when said deviation-possibility means judges that there is said possibility that the vehicle may deviate from said set course, said travel control means determines whether the vehicle may safely pass through a curve on said set course or said deviatable course having said severest passing condition at a current speed of the subject vehicle, and if the travel control means determines that the subject vehicle cannot safely pass through the curve having the severest passing condition at the current vehicle speed, the travel control means controls the traveling state of the subject vehicle by automatically reducing the speed of the subject vehicle.

8. A travel control unit according to claim 6, wherein said travel control means estimates, for each of a plurality of different points on said set course and said devistable course lying in front of the subject vehicle, a maximum vehicle speed permitting the subject vehicle to safely pass through said point, and uses a smallest value among the maximum vehicle speeds estimated for the different points as said severest passing condition for controlling the traveling state of the subject vehicle.

9. A travel control unit comprising:

a map information outputting means for outputting map information representing an output map;

a subject-vehicle position indicating means for indicating a position of a subject vehicle on said output map;

a course setting means which outputs a set travel course to a destination;

a course travel judging means for judging whether the subject vehicle is traveling on said set course;

a deviation possibility judging means for judging a possibility that the subject vehicle may deviate from said set course;

a deviatable course setting means for setting a deviatable course into which the subject vehicle may possibly deviate from said set course;

a travel control means for controlling the traveling state of the subject vehicle based on at least one of said set course and said deviatable course; and an alarm means for giving an alarm to a driver of the vehicle; wherein when said deviation-possibility judging means judges that there is a possibility that the subject vehicle may deviate from said set course, an alarm is given to the driver, and said travel control means switches from said control based on the set course to said control based on said deviatable course and said set course; and said deviation-possibility judging means judges said possibility that the subject vehicle may deviate from said set course based on an output from a direction-indicator operational state detecting means which detects an operational state of a turn indicator of said subject vehicle operated by the driver, and an output from a direction-indicator operation necessity judging means which judges whether it is necessary to operate the turn indicator at a position of the subject vehicle on said set course.

10. A travel control unit comprising:

a map information outputting means for outputting map information representing an output map;

a subject-vehicle position indicating means for indicating a position of a subject vehicle on said output map;

a course setting means which outputs a said travel course to a destination;

a course travel judging means for judging whether the subject vehicle is traveling on said set course;

a deviation possibility judging means for judging a possibility that the subject vehicle may deviate from said set course;

a deviatable course setting means for setting a deviatable course into which the subject vehicle may possibly deviate from said set course;

a travel control means for controlling the traveling state of the subject vehicle based on at least one of said set course and said deviatable course;

an alarm means for giving an alarm to a driver of the vehicle; wherein when said deviation-possibility judging means judges that there is a possibility that the subject vehicle may deviate from said set course, an alarm is given to the driver, and said travel control means switches from said control based on the set course to said control based on said deviatable course and said set course;

a deviated course setting means for determining a deviated course departing from the said set course when the course travel judging means determines that the subject vehicle has deviated from the set course; and when said set course travel judging means determines that the subject vehicle has deviated from said set course, said alarm means gives an alarm to the driver and said travel control means switches from said travel control based on said set course to said control based on said deviated course.

11. A travel control unit, comprising:

a map information outputting means for outputting map information representing an output map;

subject-vehicle position indicating means for indicating a position of a subject vehicle on said output map;

a course setting means which outputs a set travel course to a destination;

a course travel judging means for judging whether the subject vehicle is traveling on said set course;

a deviated course determining means for determining a deviated course departing from the set course;

a travel control means for controlling the traveling state of the subject vehicle based on the shape of a road on either of said set course or said deviated course in front of the subject vehicle in a traveling direction thereof;

an alarm means for giving an alarm to the driver;

wherein when said course travel judging means determines that the subject vehicle has deviated from said set course, said alarm means gives the alarm to the driver, and said travel control means switches from said control based on said set course to said control based on said deviated course;

a deviatable course setting means for setting a deviatable course into which the subject vehicle may possibly deviate from said set course; and said travel control means controls the traveling state of the subject vehicle based on said set course, said deviatable course and said deviated course.

12. A travel control unit according to claim 11, further including a deviation-possibility judging means for judging a possibility that the subject vehicle may deviate from said set course, and said deviatable course setting means sets said deviatable course based on an output from said deviation-possibility judging means.

* * * * *

UNITED STATES PATENT AND TRADEMARK OFFICE
CERTIFICATE OF CORRECTION

PATENT NO. : 5,742,240
DATED : 21 April 1998
INVENTOR(S) : Nobuyoshi Asanuma, Hiroshi Sekine It is certified that error appears in the above-identified patent and that said Letters Patent is hereby corrected as shown below:

Column 4, line 37, delete "the set course and" (first occurrence only);
        line 46, change "MS" to --M8--.
Column 5, line 6, change "subject vehicle" to --subject-vehicle--;
        line 55, change "acceleration a" to --acceleration $\alpha$--.
Column 7, line 54, change "S141" to --$S14_1$--.
Column 9, line 18, change "devistable" to --deviatable--.

Signed and Sealed this

Twenty-eighth Day of July, 1998

Attest:

BRUCE LEHMAN

*Attesting Officer*       *Commissioner of Patents and Trademarks*